(12) United States Patent
Squire

(10) Patent No.: US 11,742,885 B1
(45) Date of Patent: Aug. 29, 2023

(54) AUDIO-DRIVEN SELF POWERED PUSH TO TALK (PTT) KEYING SOURCE FOR SOUNDCARD DATA MODEMS

(71) Applicant: Matthew Edward Squire, Ingleside, IL (US)

(72) Inventor: Matthew Edward Squire, Ingleside, IL (US)

( * ) Notice: Subject to any disclaimer, the term of this patent is extended or adjusted under 35 U.S.C. 154(b) by 0 days.

(21) Appl. No.: 17/663,774

(22) Filed: May 17, 2022

Related U.S. Application Data

(60) Provisional application No. 63/201,865, filed on May 17, 2021.

(51) Int. Cl.
  *H04B 1/16* (2006.01)
  *H04B 1/3827* (2015.01)
  *H04R 3/00* (2006.01)
  *H04B 1/40* (2015.01)
  *H04W 4/10* (2009.01)

(52) U.S. Cl.
  CPC ......... *H04B 1/1607* (2013.01); *H04B 1/3833* (2013.01); *H04B 1/40* (2013.01); *H04R 3/00* (2013.01); *H04W 4/10* (2013.01)

(58) Field of Classification Search
  CPC ...... H04B 7/0695; H04B 1/385; H04B 7/088; H04B 10/114; H04B 10/116; H04B 10/27; H04B 10/516; H04B 17/318; H04B 7/0632; H04B 1/405; H04B 7/0626; H04B 7/0639; H04B 17/345; H04B 17/309; H04B 2001/3866; H04B 7/0617; H04B 7/063; H04B 1/40; H04B 17/336; H04B 1/12; H04B 1/46; H04B 17/29; H04B 7/024
  USPC .......................................................... 455/78
  See application file for complete search history.

(56) References Cited

U.S. PATENT DOCUMENTS

| | | | |
|---|---|---|---|
| 6,348,871 B1 * | 2/2002 | Tanguay ............... | G08B 29/145 340/629 |
| 2018/0323605 A1 * | 11/2018 | Kinsel ...................... | H02H 3/33 |
| 2021/0169417 A1 * | 6/2021 | Burton ................. | A61B 5/4857 |

* cited by examiner

*Primary Examiner* — Ajibola A Akinyemi
(74) *Attorney, Agent, or Firm* — Squire Patent Consulting & IP Law LLC; Brendan E. Squire

(57) ABSTRACT

A system, method, and apparatus for keying radio transmitters in data transmission. The invention includes an automated Push-To-Talk (PTT) transmitter keying/enable switch to facilitate data mode communication via radio stations. An embodiment of the present invention provides low latency or delay; independent from other firmware/subroutine layers executing properly; independent of computer 'power management' arbitrarily and capriciously shutting down vital parts of the communications chain. The PTT transmitter keying switch includes a buffering resistor to smooth a load impedance and a charge pump power demand of a driving audio input signal. A plurality of charge pump capacitors are configured to store a source charge of the driving audio input signal for the voltage multiplier. A collector of a switch transistor is configured for connection with a PTT input of the radio station transmitter. An emitter of the switch transistor coupled to the ground.

16 Claims, 1 Drawing Sheet

AUDIO-DRIVEN SELF POWERED PUSH TO TALK (PTT) KEYING SOURCE FOR SOUNDCARD DATA MODEMS

CROSS-REFERENCE TO RELATED APPLICATION

This application claims the benefit of priority of U.S. provisional application No. 63/201,865 filed May 17, 2021, the contents of which are herein incorporated by reference.

BACKGROUND OF THE INVENTION

The present invention relates to radio systems, and more particularly to automated push-to-talk switches for data packet communication via radio.

Sound card data type 'modems' have invaded the Ham Radio community to very good effect. They are responsible for providing a person with a poor to mediocre station a fighting chance against noise, adjacent channel interference, fading, and the myriad other factors which affect 'Link Budget'. Link budget is the amount of power and bandwidth needed to establish and maintain communications between two points.

The panoply of new data transmission types and their tailoring to many different methods of propagation have added 6-15 dB to a given stations link budget capability, surpassing even the venerable Morse Code as a minimum mode to maintain communications.

As can be seen, there is a need for improved apparatus and methods for data packet transmission via half-duplex.

SUMMARY OF THE INVENTION

In one aspect of the present invention, an automated Push-To-Talk (PTT) transmitter keying switch to facilitate data mode communication via a radio station transmitter is disclosed. The automated PTT switch includes a buffering resistor R1, configured to smooth a load impedance and a charge pump power demand of a driving audio input signal. A decoupling capacitor C1 is interposed between the buffering resistor and a voltage multiplier. A plurality of charge pump capacitors are configured to store a source charge of the driving audio input signal for the voltage multiplier. A final multiplier capacitor is interposed between the voltage multiplier and a ground. A base current control resistor R2 is interposed between the voltage multiplier and a base of an NPN bipolar junction switch transistor. A collector of the NPN bipolar junction switch transistor is configured for connection with a PTT input of the radio station transmitter. An emitter of the NPN bipolar junction switch transistor coupled to the ground.

In some embodiments, an adjust on test capacitor C6 interposed between the driving audio input source and a transmitter audio input of the radio station transmitter.

In other aspects of the invention, a system for data packet communication via a radio station transmitter is disclosed. The system includes a signal source generator configured to generate a driving audio signal input for a data packet. A radio station transmitter is configured to transmit the data packet audio signal. The radio station transmitter has an audio signal input terminal and a push-to-talk (PTT) input terminal. An automated Push-To-Talk (PTT) transmitter keying switch is interconnected between an audio output of the signal source generator each of the signal input terminal and the PTT input terminal, the PTT transmitter keying switch, including a buffering resistor R1, configured to smooth a load impedance and a charge pump power demand of the driving audio input signal, a decoupling capacitor C1 interposed between the buffering resistor and a voltage multiplier, a plurality of charge pump capacitors configured to store a source charge of the driving audio input signal for the voltage multiplier; and an NPN bipolar junction switch transistor, configured to selectively activate the PTT input terminal for transmission of the data packet via the radio station transmitter.

In some embodiments, a final multiplier capacitor interposed between the voltage multiplier and a ground.

In some embodiments, a base current control resistor R2 is interposed between the voltage multiplier and a base of the NPN bipolar junction switch transistor. A collector of the NPN bipolar junction switch transistor coupled with the PTT input of the radio station transmitter. An emitter of the NPN bipolar junction switch transistor is coupled to the ground.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide an apparatus and method for providing automated Push-To-Talk (PTT) transmitter keying/enable switch to facilitate Data mode communication via radio stations. An embodiment of the present invention provides: a Low Latency or Delay; is independent from other firmware/subroutine layers executing properly; is independent of computer 'power management' arbitrarily and capriciously shutting down vital parts of the communications chain; requires a external power supply; is not reliant on 'hooks' or interrupts that need to be watched carefully when updating or being forced to update software or operating systems; avoids stuck transmitter resistance (Nothing Annoys the radio community more than a channel that is occupied and Jammed by a stuck transmitter).

Figure 1:
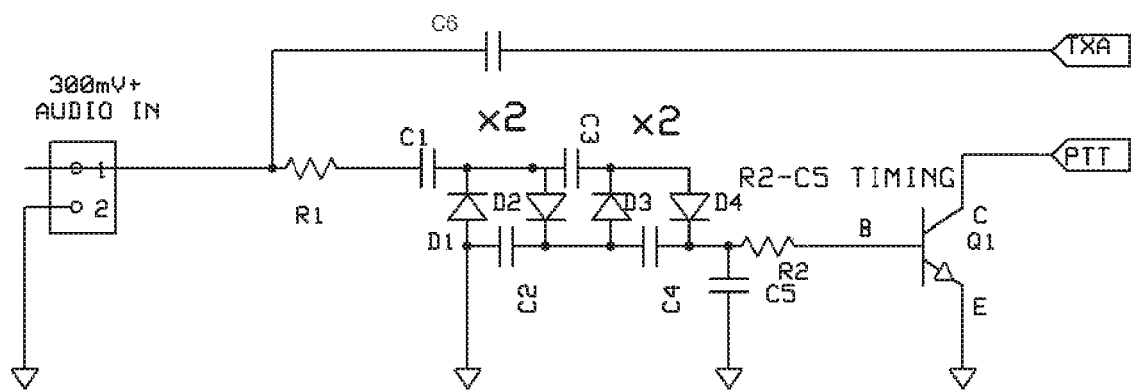
FIG. 1 is a circuit diagram for a FAST Push-to-Talk switch.
Figure 2:
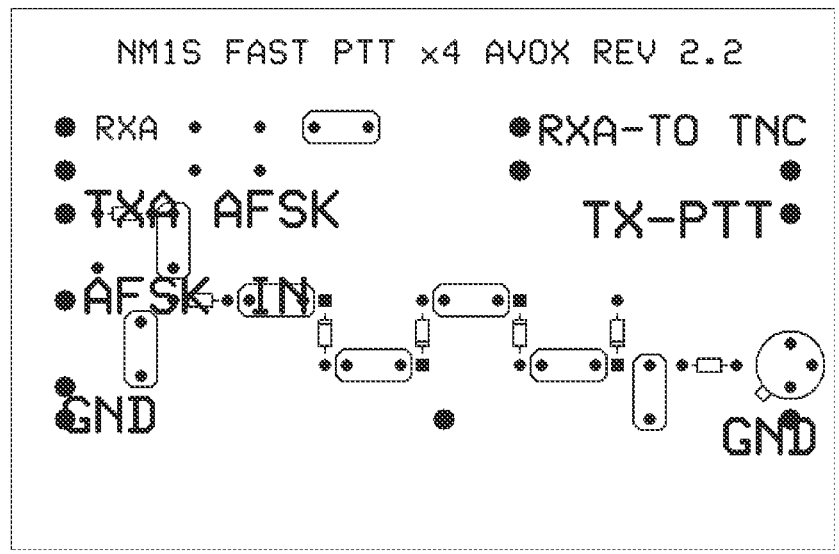
FIG. 2 is a representative circuit board implementation of the FAST Push-to-Talk switch.

A circuit diagram of a non-limiting embodiment of the fast-push-talk switch is shown in reference to FIG. 1, components of which are described in the following:

R1: is a buffering resistor, smooths load impedance and charge pump power demands of a driving audio signal. The buffering resistor may have a resistance value of between 50-500 Ohms, source impedance dependent.

C1: Is a decoupling capacitor, that decouples DC, Hum and noise from a quadrupler circuit. The decoupling capacitor has a value between 0.1-10 uF, dependent on a modulating frequency and an equalization.

C2-4: Are charge pump capacitors. The charge pump capacitors store a source charge for a voltage multiplication process. The charge pump capacitors have values 0.1-10 uF modulation frequency dependent.

C5: a final multiplier capacitor as well as Keying timing and hangtime. The final multiplier capacitor has values 0.1-10 uF, which is also modulation frequency and latency dependent.

R2: is a Q1 Base (Ibe) current control resistor, chosen for individual transistor hfe (gain) spec for hard Vbe (sat) switching. The base current control resistor has a value 500-5K ohms dependent on Q1 Selection . . .

Q1: is an NPN bipolar junction switch transistor with an hfe (gain) of 100 or more that provides Low Vce for switching. Value 2N4401, 2N2222, 2N3904, and BLF, BC846,7,8 and 50 series.

Most of this discussion will be taking place in the Land Of Half-Duplex where each of one or more radio stations must share the same/single audio or radio channel with only 1 station 'talking' at a time, as in polite conversation.

Earlier computers were equipped with an RS-232 port for the computer to communicate with a 'Mainframe' computer, a terminal, a date collection and routing device, a machine control, and other equipment which, by their nature or purpose weren't 'Smart' enough for establishing high-speed data links or capabilities. The signaling and handshaking ports used by standards for the RS-232 port (RTS & CTS, etc.) were used as transmitter 'Keying' ports to provide a PTT transmitter switch closure from the 1 or 0 logic signals present. Most radio enthusiasts in those days went with the RS-232 Data signaling ports (RTS/CTS, etc.) in the RS-232 standard to provide a PTT key to the radio, since this action closely mimics what the standard does with its 'hardware'.

In software and programming, these protocols are easy to write, but are generally external to the executing program and can suffer from inconsistencies and lockups. Then came the prolific/ftdi lawsuit jungle and the 'updated' drivers which caused no end of troubles, even to this day. Stuck transmitters and hung ports became the norm. The least common denominator in all of these was the actual transmitted modem audio that the modem program generates (The Bird-Chirping sounds) to convey the data between point A and point B.

VOX—Voice-Operated Switches;

Most VOX circuits are now self-contained in the radio transceiver and come equipped from the factory with VOX circuits that are designed for voice communications between 2 radios. These VOX circuits are designed for a significant delay time built-in to keep unwanted sounds from keying the associated transmitter. The VOX circuits also provide a significant 'Hang Time' after the spoken words of the voice communication, so the transmitter stays keyed after the voice communication stops. This can be demonstrated by picking up almost any pair of walkie talkies or by talking with your boss on speaker phone. Considerable fiddling is required to tailor the VOX to the individual's speaking style.

In a Data exchange application, the 'normal' voice tailored VOX circuit is somewhat useless as the Data Packet itself is too brief to effectively key the VOX circuit into PTT or TX. When the VOX circuit is able to key the PTT, the keying takes place a considerable 'Length' into the 'frame' of the data packet, rendering the data packet useless. While a data packet preamble can be used to 'Wake up' the VOX circuit, this renders the modem 'deaf' while it is busy keying. Consequently, the associated 'Hang Time' renders the channel 'busy' as the device un-keys to Receive RX. At a minimum baud rate (300) a Hangtime of ½second is 2 properly timed frames of channel data lost.

In some modes the hang-time can cause the data to interfere with it's own relayed packets or at the least slows the channel's data rate capacity down. Most users consider long preambles (TXDELAY) and long hang-time (TXHANG) as rude behavior.

THE $90+ PTT VOX

Many firms now offer a self-contained VOX or RS-232 (simulated through the USB Layer) PTT with minimum latency. Some even offer this feature as self-contained inside their own Sound card that is optimized for the data modes found in radio service. Others even offer delay line devices so the data frame isn't truncated, but the circuit will still suffer from TX/RX latency issues.

The $90+ PTT VOX and the Old Cellphone/Elderly Computer TNC Packet Decoder.

I was horrified, financially that I had to connect my 'Trailing edge computer' TNC (and now trailing edge smartphone) and cheap ($20-40) converted re-banding surplus radio to a $90 PTT Switch.

While combating 'Twist' (the unbalanced Mark/Space 1/0 modulation of modem tones) using both a service monitor and an onboard Sound-Card signal generator to generate the 1200 and 2200 tones to align the transmit modulation audio path on this model radio and others, the clamping diodes on the accessory input rails, when over-driven, act as a rectifier circuit, producing voltage and clipping the input waveform at 0.7V, thus protecting sensitive electronics 'downstream' from potentially damaging voltage spikes. The ability of the computer sound card to drive signal into this 'hard' clipping range and low impedance caught my attention.

Why Can't I Rectify the incoming Audio (AC Signal) and use the DC level to switch a Transistor ON for a simple common-emitter PTT TX keying circuit?

I shouldn't need any amplification nullification (hybriding/anti-vox) and delay circuits in the traditional sense of VOX to key a transistor ON one needs only 0.3-0.7 VDC of Vbe bias voltage. A full wave rectifier bridge, while effective, only started rectification at the silicon barrier point of 0.7V. This was enough audio to considerably overdrive the modulation circuit. I then substituted Germanium diodes in the bridge rectifier as at 0.3V the RMS value to trip would increase by 1.4*RMS.

I also started looking at a retired Smart Phone using APRS Droid as an Audio TNC. There is in the range of 1 VAC available from the headphone jack on this device.

Using the app in an improvised fashion while traveling; holding the keyed microphone over the phone's speaker and so modulating the APRS Data Packet Frame and transmitting it into the RF packet network. Only 1-3 frames a day from strategic points along the way as I considered more than that to be 'rude behavior' as it clogs the channel with slow human reaction time.

A Trailing-edge Smart phone equipped with APRS Droid, was capable of 1 VAC RMS however, at this power level, presents two challenges: 1. Continuous high output damaging the trailing-edge audio chip leading to it's demise; and 2. actual power consumption at full audio output at headphones is considerable. There is also an annoying warning app that sometimes turns the audio down.

I was hoping to reduce audio level enough to where the smartphone and a $30 Walky-Talky could be put together for parade and event tracking & messaging purposes making a full 8-12 hours of useful battery life.

Failure had me on the right track as I had helped a friend troubleshoot a failed high voltage coil pack in his vehicle. These no longer are 'Coils' but many stacked voltage multipliers. A Germanium/Schottkey diode full-wave bridge, half-wave doubler, tripler and quadrupler circuits, such as a Germanium/Schottkey multiplier drive a Silicon 2N4401, 2N2222, 2N3904 switch transistor with a lower output AC voltage being multiplied then rectified to DC passing the 'trip' or Vbe (sat) saturation/switch point of 0.7V.

The price paid was increased latency of 3-5 half-wave cycles at the modulating frequency as the Charge Pump in the multiplier charged up prior to tripping the switch. At a minimum modulating frequency of 200 Hz this yields 15-25 mS, 3-4 full cycles for the charge-pump multiplier to start, more than an adequate latency for our purposes here. A small signal Schottky Diode may also be employed for the Multiplier and rectifier circuits. These have the advantage of activating at even lower voltages, however, they are prone to leakage. Germanium diodes with much lower Vbe SAT figures than Silicon (Mostly considered Obsolete) switch transistors may also be utilized as well as the 2N4401, 2N2222, 2N3904 switches.

Correctly matching the charge-pump capacitance provides some immunity to 'Hum pickup' keying the circuit as well; The charge pumps are time-constanted for a 250 Hz modulating frequency and above. This provides that any interfering 60 Hz Hum signal be 4×6 dB+ the level of the 250 hz modulating signal before tripping the PTT. 'Swamping' low impedance resistors in the input and output coupling circuitry also provide good Hum immunity.

Some timing adjustments may be needed for lower data rate/modulation frequency modes. Phase shift keying can also produce Bessel Nulls which can cause dropouts with the faster latency circuit. There is sufficient flexibility in the circuit to adapt to these conditions.

A 1.0 uF (10×) is substituted at the Vb junction for JT8 and PSK-31. This increasing latency and hang-time to 60-100 ms for the unique requirements of these low-data-rate modes, the effect of which is mostly invisible while 'in contact'.

Full-wave bridge: While the TX Audio may float ground it does and must become Ground referenced after the multiplication bridge to 'pull' the PTT Transistor. The passive switch will have to share the same ground with the device that it keys.

It should be understood, of course, that the foregoing relates to exemplary embodiments of the invention and that modifications may be made without departing from the spirit and scope of the invention as set forth in the following claims.

What is claimed is:

1. An automated Push-To-Talk (PTT) transmitter keying switch to facilitate data mode communication via a radio station transmitter, comprising:
   a buffering resistor R1, configured to smooth a load impedance and a charge pump power demand of a driving audio input signal;
   a decoupling capacitor C1 interposed between the buffering resistor and a voltage multiplier;
   a plurality of charge pump capacitors configured to store a source charge of the driving audio input signal for the voltage multiplier;
   a final multiplier capacitor interposed between the voltage multiplier and a ground;
   a base current control resistor R2 interposed between the voltage multiplier and a base of an NPN bipolar junction switch transistor;
   a collector of the NPN bipolar junction switch transistor configured for connection with a PTT input of the radio station transmitter; and
   an emitter of the NPN bipolar junction switch transistor coupled to the ground.

2. The automated PTT transmitter keying switch of claim 1, further comprising
   an adjust on test capacitor C6 interposed between the driving audio input source and a transmitter audio input of the radio station transmitter.

3. The automated PTT transmitter keying switch of claim 1, wherein the base current control resistor has a value 500-5K ohms.

4. The automated PTT transmitter keying switch of claim 1, wherein the buffering resistor has a resistance value of between 50-500 Ohms.

5. The automated PTT transmitter keying switch of claim 1, wherein the decoupling capacitor has value of between 0.1-10 uF, selected based on a modulating frequency of a signal transmitted by the radio station transmitter.

6. The automated PTT transmitter keying switch of claim 1, wherein the plurality of charge pump capacitors have values 0.1-10 uF, selected based on a modulating frequency of a signal transmitted by the radio station transmitter.

7. The automated PTT transmitter keying switch of claim 1, wherein the final multiplier capacitor has values of between 0.1-10 uF, selected based on a modulation frequency a signal transmitted by the radio station transmitter and a latency.

8. A system for data packet communication via a radio station transmitter, comprising:
   a signal source generator configured to generate a driving audio signal input for a data packet;
   a radio station transmitter, configured to transmit the data packet audio signal, the radio station transmitter having an audio signal input terminal, and a push-to-talk (PTT) input terminal; and
   an automated Push-To-Talk (PTT) transmitter keying switch interconnected between an audio output of the signal source generator each of the signal input terminal and the PTT input terminal, the PTT transmitter keying switch, including a buffering resistor R1, configured to smooth a load impedance and a charge pump power demand of the driving audio input signal, a decoupling capacitor C1 interposed between the buffering resistor and a voltage multiplier, a plurality of charge pump capacitors configured to store a source charge of the driving audio input signal for the voltage multiplier; and an NPN bipolar junction switch transistor, configured to selectively activate the PTT input terminal for transmission of the data packet via the radio station transmitter.

9. The system of claim 8, further comprising:
   a final multiplier capacitor interposed between the voltage multiplier and a ground.

10. The system of claim 9, further comprising:
    a base current control resistor R2 interposed between the voltage multiplier and a base of the NPN bipolar junction switch transistor;
    a collector of the NPN bipolar junction switch transistor coupled with the PTT input of the radio station transmitter; and
    an emitter of the NPN bipolar junction switch transistor coupled to the ground.

11. The system of claim 10, further comprising
    an adjust on test capacitor C6 interposed between the driving audio input source and a transmitter audio input of the radio station transmitter.

12. The system of claim 10, wherein the base current control resistor has a value 500-5K ohms.

13. The system of claim 10, wherein the buffering resistor has a resistance value of between 50-500 Ohms.

14. The system of claim 10, wherein the decoupling capacitor has value of between 0.1-10 uF, selected based on a modulating frequency of a signal transmitted by the radio station transmitter.

15. The system of claim 10, wherein the plurality of charge pump capacitors have values of between 0.1-10 uF, selected based on a modulating frequency of a signal transmitted by the radio station transmitter.

16. The system of claim 10, wherein the final multiplier capacitor has a value of between 0.1-10 uF, selected based on a modulation frequency a signal transmitted by the radio station transmitter and a latency.

\* \* \* \* \*